(12) United States Patent  
Kuze et al.

(10) Patent No.: US 7,606,121 B2  
(45) Date of Patent: Oct. 20, 2009

(54) OPTICAL DISK DRIVE WITH TARGET FOCUS CONTROL

(75) Inventors: Yuuichi Kuze, Hirakata (JP); Katsuya Watanabe, Nara (JP)

(73) Assignee: Panasonic Corporation, Kadoma (JP)

( * ) Notice: Subject to any disclaimer, the term of this patent is extended or adjusted under 35 U.S.C. 154(b) by 571 days.

(21) Appl. No.: 11/189,539

(22) Filed: Jul. 26, 2005

(65) Prior Publication Data  
US 2006/0023579 A1  Feb. 2, 2006

(30) Foreign Application Priority Data  
Jul. 29, 2004  (JP) .............................. 2004-221326

(51) Int. Cl.  
*G11B 7/00* (2006.01)

(52) U.S. Cl. .............. 369/44.29; 369/44.35; 369/53.28; 369/53.37

(58) Field of Classification Search ........................ None  
See application file for complete search history.

(56) References Cited

U.S. PATENT DOCUMENTS

| 5,077,719 A | 12/1991 | Yanagi et al. |
| 5,251,194 A | 10/1993 | Yoshimoto et al. |
| 5,828,636 A | 10/1998 | Matsumoto et al. |
| 5,970,032 A | 10/1999 | Ikeda et al. |
| 6,078,551 A | 6/2000 | Komma et al. |

FOREIGN PATENT DOCUMENTS

| EP | 0 361 920 | 9/1989 |
| JP | 63-188832 | 8/1988 |
| JP | 63-288427 | 11/1988 |
| JP | 64-057427 | 3/1989 |
| JP | 2-257435 | 10/1990 |
| JP | 3-141039 | 6/1991 |
| JP | 6-349095 | 12/1994 |
| JP | 9-7195 | 1/1997 |
| JP | 11-273099 | 10/1999 |

(Continued)

OTHER PUBLICATIONS

Japanese Office Action for corresponding Application No. 2007-219681 dated Oct. 30, 2007. (English translation provided).

(Continued)

*Primary Examiner*—Paul Huber  
(74) *Attorney, Agent, or Firm*—Renner, Otto, Boisselle & Sklar LLP

(57) ABSTRACT

An optical disk drive includes: a light source for producing a light beam; an objective lens for converging the light beam; an actuator for moving the objective lens with respect to an optical disk; a converging state detecting section for generating a focus error signal representing a converging state of the light beam on an information storage layer of the optical disk; and a focus control section for controlling the operation of the actuator such that the focus position of the light beam matches its target focus position as closely as possible in accordance with information about the target focus position and the focus error signal. The optical disk drive changes the target focus positions of the light beam when modes of operation are switched from a read mode into a write mode, or vice versa.

16 Claims, 13 Drawing Sheets

FOREIGN PATENT DOCUMENTS

| | | |
|---|---|---|
| JP | 2000-285480 | 10/2000 |
| JP | 2001-202619 | 7/2001 |
| JP | 2002-56536 | 2/2002 |
| JP | 2002-150575 | 5/2002 |
| JP | 2005-141851 | 6/2005 |

OTHER PUBLICATIONS

European Search Report issued on Apr. 19, 2007 for European Application No. 05016342.7.

English translation of Notice of Reasons for Rejection, issued on Jan. 23, 2007 for Japanese Application No. 2005-212665.

Extended European Search Report issued on Jul. 10, 2007 for European Application No. 05016342.7.

Japanese Office Action for corresponding Application No. 2005-212665 dated Jul. 3, 2007. (English translation provided).

OPTICAL DISK DRIVE WITH TARGET FOCUS CONTROL

BACKGROUND OF THE INVENTION

1. Field of the Invention

The present invention relates to an optical disk drive and a method for driving the optical disk drive and more particularly relates to a focus control on an optical disk drive.

2. Description of the Related Art

In optical disk technologies, data or information can be read out from a rotating optical disk by irradiating the disk with a relatively weak light beam, and detecting the light that has been modulated by, and reflected from, the optical disk.

On a read-only optical disk, information is already stored as pits that are arranged spirally during the manufacturing process of the optical disk. On the other hand, on a rewritable optical disk, a recording material film, from/on which data can be read and written optically, is deposited by an evaporation process, for example, on the surface of a substrate on which tracks with spiral lands or grooves are arranged. In writing data on such a rewritable optical disk, data is written there by irradiating the optical disk with a light beam, of which the optical power has been changed according to the data to be written, and locally changing the property of the storage material film.

It should be noted that the depth of the pits, the depth of the tracks, and the thickness of the storage material film are all smaller than the thickness of the optical disk substrate. For that reason, those portions of the optical disk, where data is stored, define a two-dimensional plane, which is sometimes called an "information storage plane". However, considering that such an "information storage plane" has a physical dimension in the depth direction, too, the term "information storage plane" will be replaced herein by another term "information storage layer". Every optical disk has at least one such information storage layer. Optionally, a single information storage layer may actually include a plurality of layers such as a phase-changeable material layer and a reflective layer.

To read or write data from/on an optical disk, the light beam always needs to maintain a predetermined converging state on a target track on an information storage layer. For that purpose, a "focus control" and a "tracking control" are required. The "focus control" means controlling the position of an objective lens perpendicularly to the information storage layer (which direction will be referred to herein as a "substrate depth direction") such that the focus position (or converging point) of the light beam is always located on the information storage layer. On the other hand, the "tracking control" means controlling the position of the objective lens along the radius of a given optical disk (which direction will be referred to herein as a "disk radial direction") such that the light beam spot is always located right on a target track.

Various types of optical disks such as DVD-ROM, DVD-RAM, DVD-RW, DVD-R, DVD+RW and DVD+R have become more and more popular these days as storage media on which a huge amount of information can be stored at a high density. Optical disk drives compatible with those optical disks use an optical lens (i.e., an objective lens) with a numerical aperture (NA) of 0.6. Recently, however, in order to further increase the maximum densities and capacities of the optical disks, next-generation optical disks, including Blu-ray Disc (BD), have been under research and development and have already been put on the market. They suggest that an optical lens with an NA of at least 0.8 be used for such next-generation optical disks. A conventional optical disk drive of that type is disclosed in Japanese Patent Application Laid-Open Publication No. 11-273099 (see Paragraphs Nos. 9 through 18 and Nos. 35 through 51 and FIGS. 1 through 9 among other things), for example.

Japanese Patent Application Laid-Open Publication No. 11-273099 discloses that the level of a focus error (FE) signal changes with the intensity of a laser beam incident on an optical disk and also discloses a focus servo-control to be carried out using a "normalized FE signal", which is obtained by dividing the FE signal by the intensity of reflected light. According to Japanese Patent Application Laid-Open Publication No. 11-273099, an electrical offset is produced in the normalized FE signal to a degree that changes with the mode of operation, which may be read, write or erase. This offset is caused by a circuit system for normalization and has mutually different magnitudes in the read, write and erase modes. Accordingly, even if this offset can be completely corrected in the read mode, for example, the offset may not be compensated for in the write and erase modes and the laser beam may be defocused.

Thus, in the focus servo control disclosed in Japanese Patent Application Laid-Open Publication No. 11-273099, the magnitude of an offset in the read mode is used as a reference offset, differences between the reference offset and an offset in each of the two other modes is calculated, and the offsets in the write and erase modes are compensated for appropriately, thereby minimizing the defocusing in all three modes of operation.

According to this conventional technique, the electrical offsets can be eliminated from circuit systems for the read, write and erase modes. However, this technique does not work fine if the read, write and erase modes have respectively different best focus positions.

The present inventors discovered as a result of researches that at a high NA, the read, write and erase modes had respectively different best focus positions. The reason will be described later. However, in the prior art, nobody has ever changed the focus position of a laser beam into its best position according to the mode of operation.

We also discovered that if the focus positions and the intensities of a laser beam were simply changed when the modes of operation were switched from read into write or from read into erase, then the focus control could not be carried out with high reliability.

SUMMARY OF THE INVENTION

In order to overcome the problems described above, an object of the present invention is to provide an optical disk drive that can start a write or erase operation with high reliability when the modes of operation are switched either from read into write or from read into erase.

An optical disk drive according to a preferred embodiment of the present invention preferably includes: a light source for producing a light beam; an objective lens for converging the light beam; an actuator for moving the objective lens with respect to an optical disk; converging state detecting means for generating a focus error signal representing a converging state of the light beam on an information storage layer of the optical disk; and focus control means for controlling the operation of the actuator such that the focus position of the light beam matches its target focus position as closely as possible in accordance with information about the target focus position and the focus error signal. The optical disk drive preferably changes the target focus positions of the light beam when modes of operation are switched from a read mode into a write mode, or vice versa.

In one preferred embodiment of the present invention, the target focus positions of the light beam may include a first target focus position for the read mode and a second target focus position for the write mode, and the focus control means may set the focus position of the light beam to the first target focus position in the read mode and to the second target focus position in the write mode, respectively.

In this particular preferred embodiment, the target focus positions of the light beam preferably further include a third target focus position for an erase mode, and the focus control means preferably sets the focus position of the light beam to the third target focus position in the erase mode.

In another preferred embodiment, in changing the target focus positions when the modes of operation are switched between the read and write modes, the quantities of the light beam are preferably changed non-synchronously with the change of the target focus positions.

In still another preferred embodiment, the optical disk drive may further include focus position changing means for modifying focus position information that defines the target focus position of the light beam and light beam intensity changing means for changing the quantities of the light beam. When the modes of operation are switched between the read and write modes, the focus position changing means may output focus position information for a newly selected mode non-synchronously with the change of the quantities of the light beam.

In this particular preferred embodiment, when the light beam intensity changing means changes the quantities of the light beam from one for the read mode into either one for the write mode or one for the erase mode, the focus position changing means preferably changes the focus position information for the read mode into either information for the write mode or information for the erase mode. The light beam intensity changing means preferably changes the quantities of the light beam after the focus position information has been changed.

In a specific preferred embodiment, the focus position changing means preferably includes: a first storage section for storing a read-mode focus position; a second storage section for storing a first value of difference between the read-mode focus position and a write-mode focus position; and a third storage section for storing a second value of difference between the read-mode focus position and an erase-mode focus position. In outputting the focus position information for the read mode, the optical disk drive preferably outputs the read-mode focus position. In outputting the focus position information for the write mode, the optical disk drive preferably adds the first value of difference to the read-mode focus position and then outputs the sum. And in outputting the focus position information for the erase mode, the optical disk drive preferably adds the second value of difference to the read-mode focus position and then outputs the sum.

In that case, the first and second quantities of differences preferably change their values with a storage property of the optical disk.

Alternatively or additionally, the first and second quantities of differences may be updated in accordance with information that is stored on the optical disk.

In yet another preferred embodiment, the optical disk drive may further include a circuit offset canceling section. The circuit offset canceling section may output the magnitude of a circuit offset, which is produced when the modes of operation are switched between the read mode and the write mode, to the focus control means.

In yet another preferred embodiment, after the focus position changing means has changed the focus position information and before the quantities of the light beam are changed, the objective lens may be moved toward a target storage location.

In yet another preferred embodiment, the optical disk drive may further include focus position changing means for changing focus position information that defines the target focus position of the light beam, and a focus position information getting section for getting the focus position information from outside of the optical disk drive.

In this particular preferred embodiment, the focus position information getting section preferably extracts the focus position information from data that is stored on the optical disk.

In an alternative preferred embodiment, the focus position information getting section may acquire the focus position information that has been either downloaded over the Internet or received as a radio wave from a base station.

In yet another preferred embodiment, the optical disk drive may further include focus position changing means for changing focus position information that defines the target focus position of the light beam, and the optical disk drive may determine the target focus position by learning.

In this particular preferred embodiment, the optical disk drive preferably further includes initializing means for logically initializing the information storage layer of the optical disk. When the initializing means initializes the information storage layer of the optical disk, information about the target focus position that has been determined by learning is preferably stored on the optical disk.

An optical disk according to a preferred embodiment of the present invention preferably stores thereon information that represents mutually different target focus positions for a read mode and a write mode.

A driving method according to a preferred embodiment of the present invention is a method for driving an optical disk drive that includes: a light source for producing a light beam; an objective lens for converging the light beam; an actuator for moving the objective lens with respect to an optical disk; converging state detecting means for generating a focus error signal representing a converging state of the light beam on an information storage layer of the optical disk; and focus control means for controlling the operation of the actuator such that the focus position of the light beam matches its target focus position as closely as possible in accordance with information about the target focus position and the focus error signal. The driving method includes the steps of, when modes of operation are switched between a read mode and a write mode, changing the target focus positions of the light beam between a target for the read mode and a target for the write mode, and changing the optical powers of the light beam produced by the light source between a power for the read mode and a power for the write mode.

An electronic component according to a preferred embodiment of the present invention stores thereon a program for driving an optical disk drive that includes: a light source for producing a light beam; an objective lens for converging the light beam; an actuator for moving the objective lens with respect to an optical disk; converging state detecting means for generating a focus error signal representing a converging state of the light beam on an information storage layer of the optical disk; and focus control means for controlling the operation of the actuator such that the focus position of the light beam matches its target focus position as closely as possible in accordance with information about the target focus position and the focus error signal. The program is preferably defined so as to make the optical disk drive perform the steps of, when modes of operation are switched between a read mode and a write mode, changing the target focus positions of the light beam between a target for the read mode and a target for the write mode, and changing the optical powers of the light beam produced by the light source from a power for the read mode into a power for the write mode.

According to various preferred embodiments of the present invention described above, the focus position of a light beam can be shifted to positions where the best read and write performances are achieved in the read and write modes, respectively. As a result, a high-reliability optical disk drive can be provided.

Other features, elements, processes, steps, characteristics and advantages of the present invention will become more apparent from the following detailed description of preferred embodiments of the present invention with reference to the attached drawings.

Figure 2:
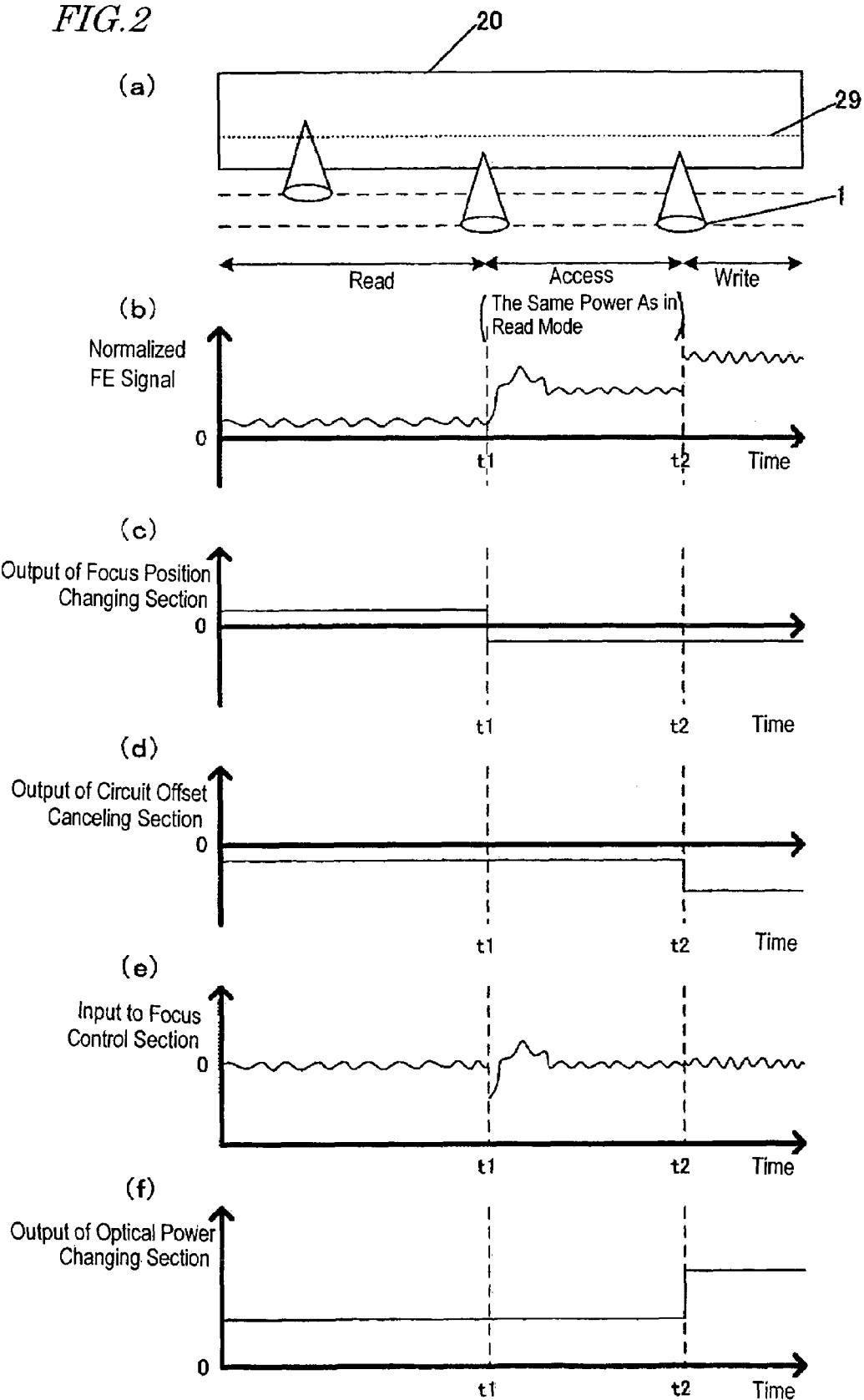

Portion (a) of FIG. 2 is a cross-sectional view schematically illustrating the positions of an objective lens with respect to a laser beam spot on the information storage layer of an optical disk.

Portion (b) of FIG. 2 is a timing diagram showing how a normalized FE signal changes with time.

Portion (c) of FIG. 2 is a timing diagram showing how the output of a focus position changing section changes with time.

Portion (d) of FIG. 2 is a timing diagram showing how the output of a circuit offset canceling section changes with time.

Portion (e) of FIG. 2 is a timing diagram showing how the input to a focus control section changes with time.

Portion (f) of FIG. 2 is a timing diagram showing how the output of a optical power changing section changes with time.

Figure 3:
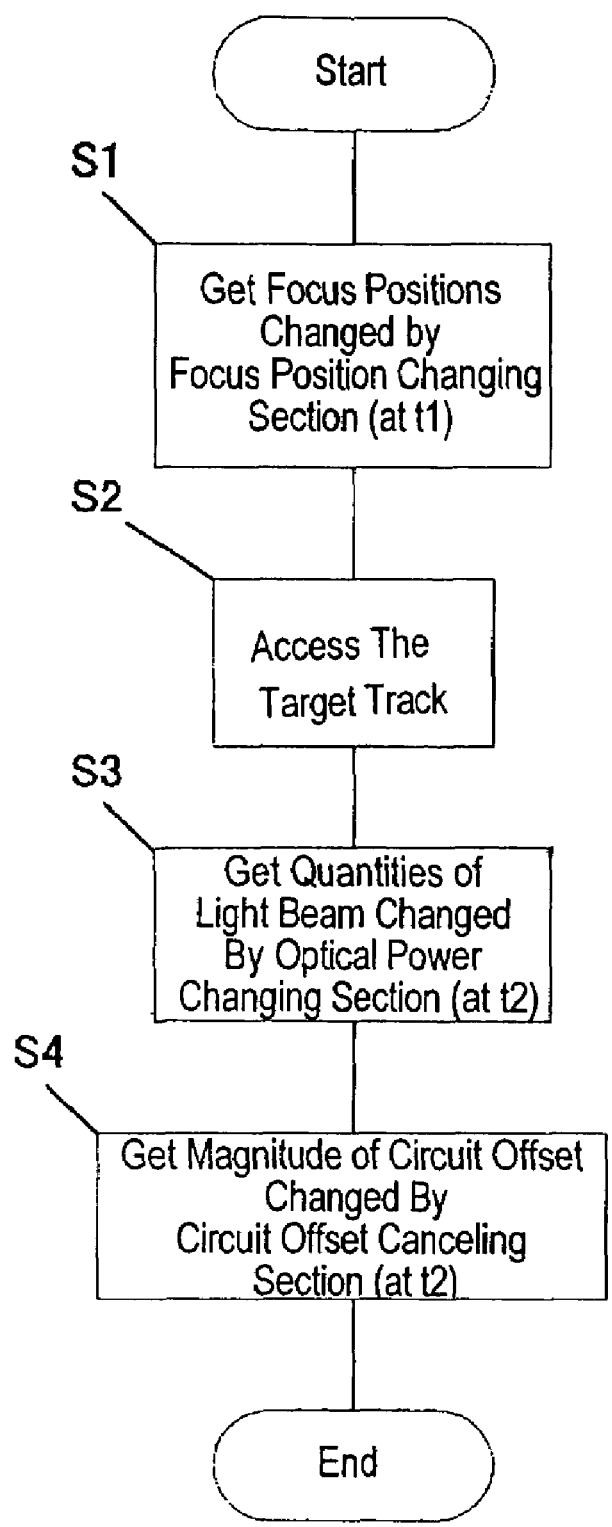

FIG. 3 is a flowchart showing how the focus position changing section, circuit offset canceling section and optical power changing section operate.

Figure 4:
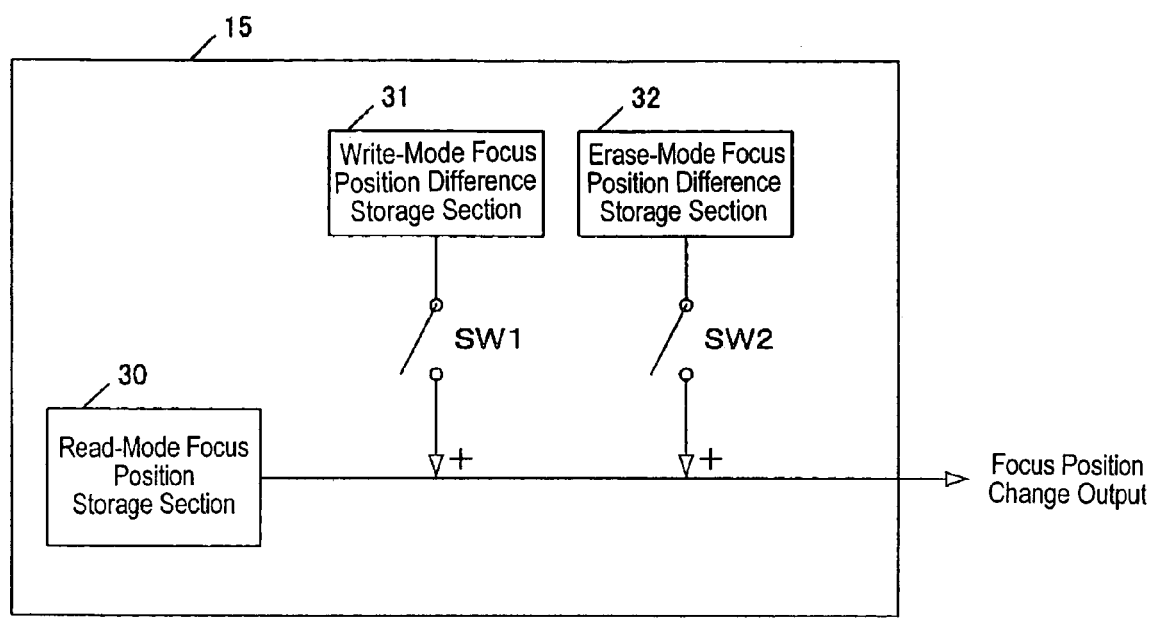

FIG. 4 is a block diagram showing the details of the focus position changing section.

Figure 5:
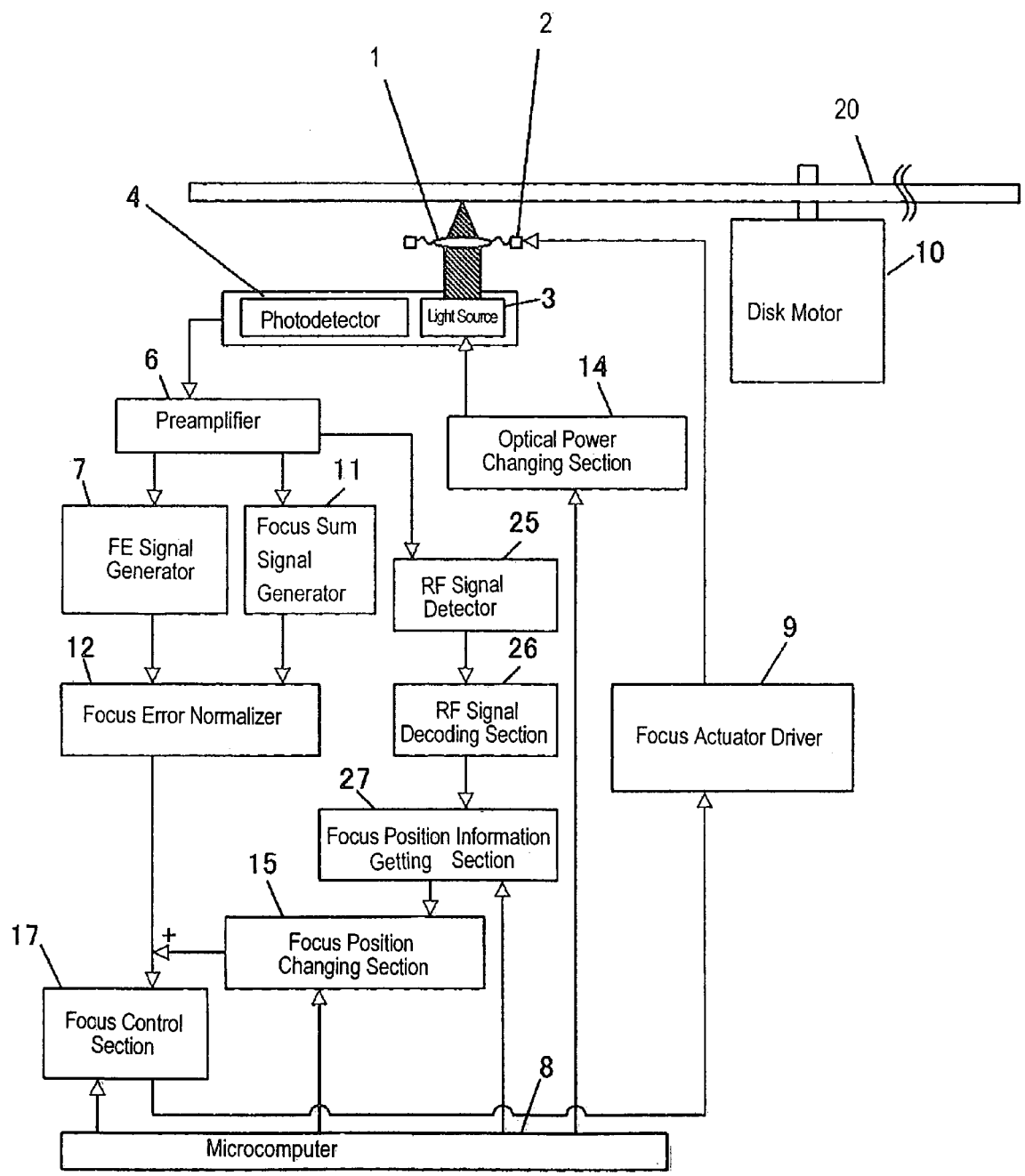

FIG. 5 is a block diagram showing an optical disk drive according to a second preferred embodiment of the present invention.

Figure 6:
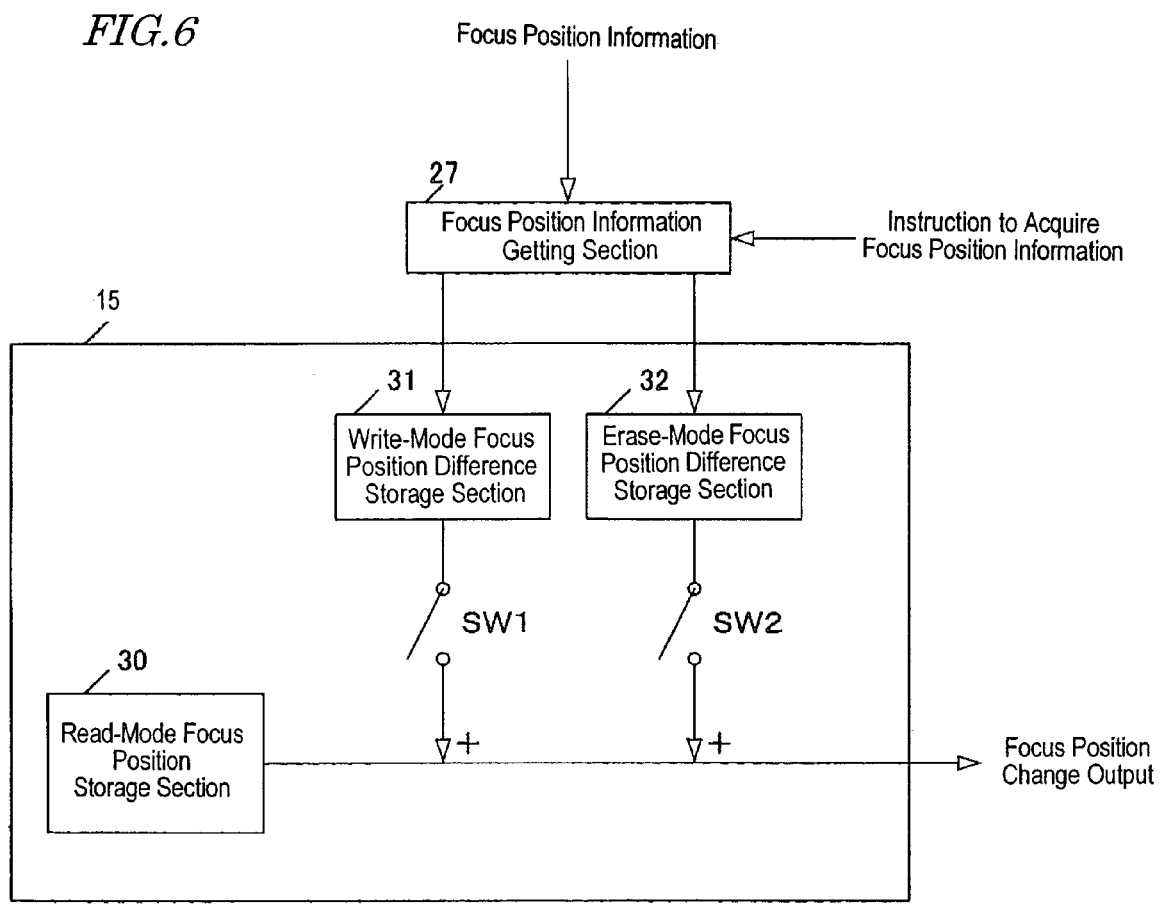

FIG. 6 is a block diagram showing a focus position information getting section and the details of the focus position changing section.

Figure 7:
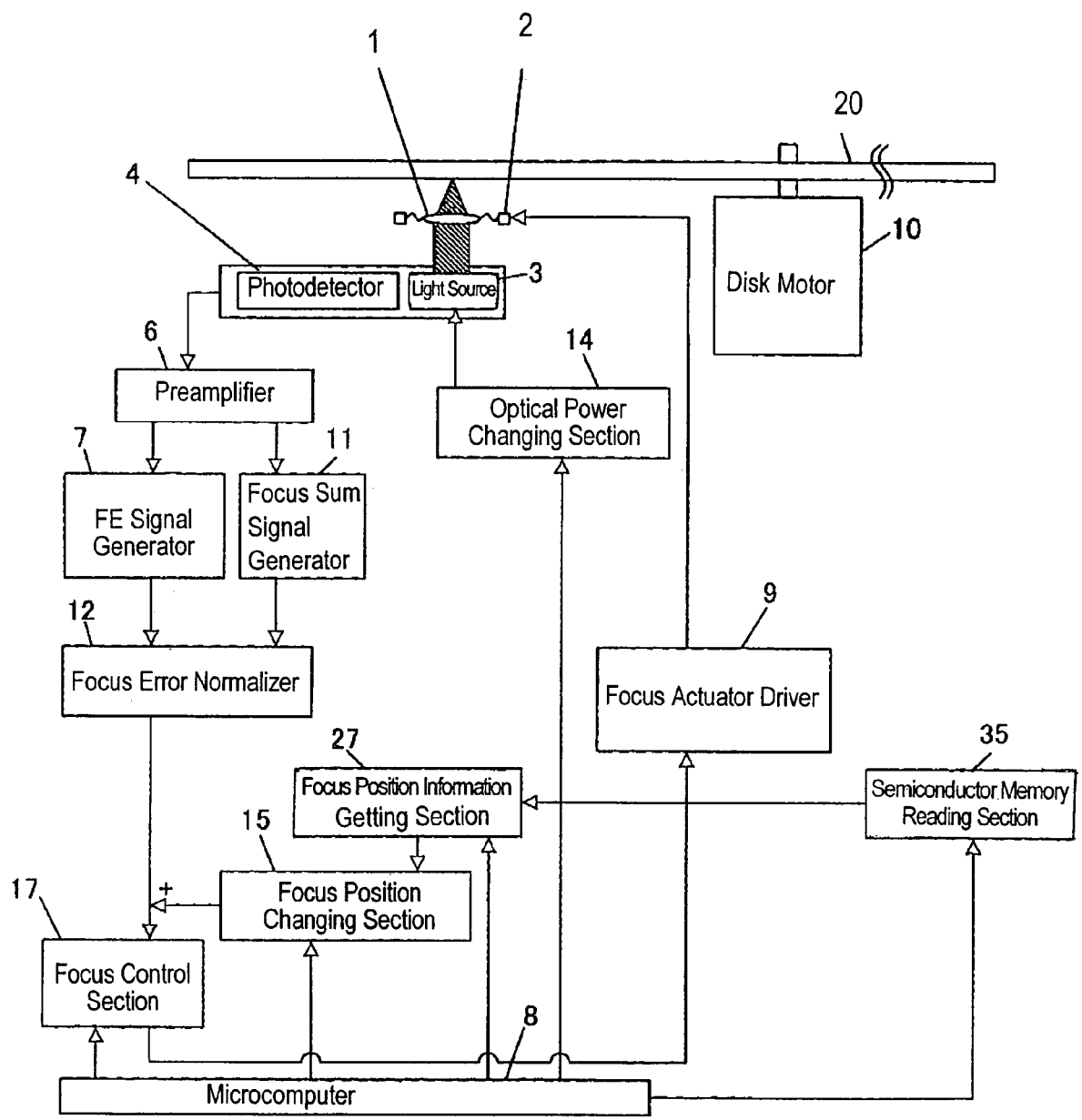

FIG. 7 is a block diagram showing an optical disk drive according to a modified example of the second preferred embodiment.

Figure 8:
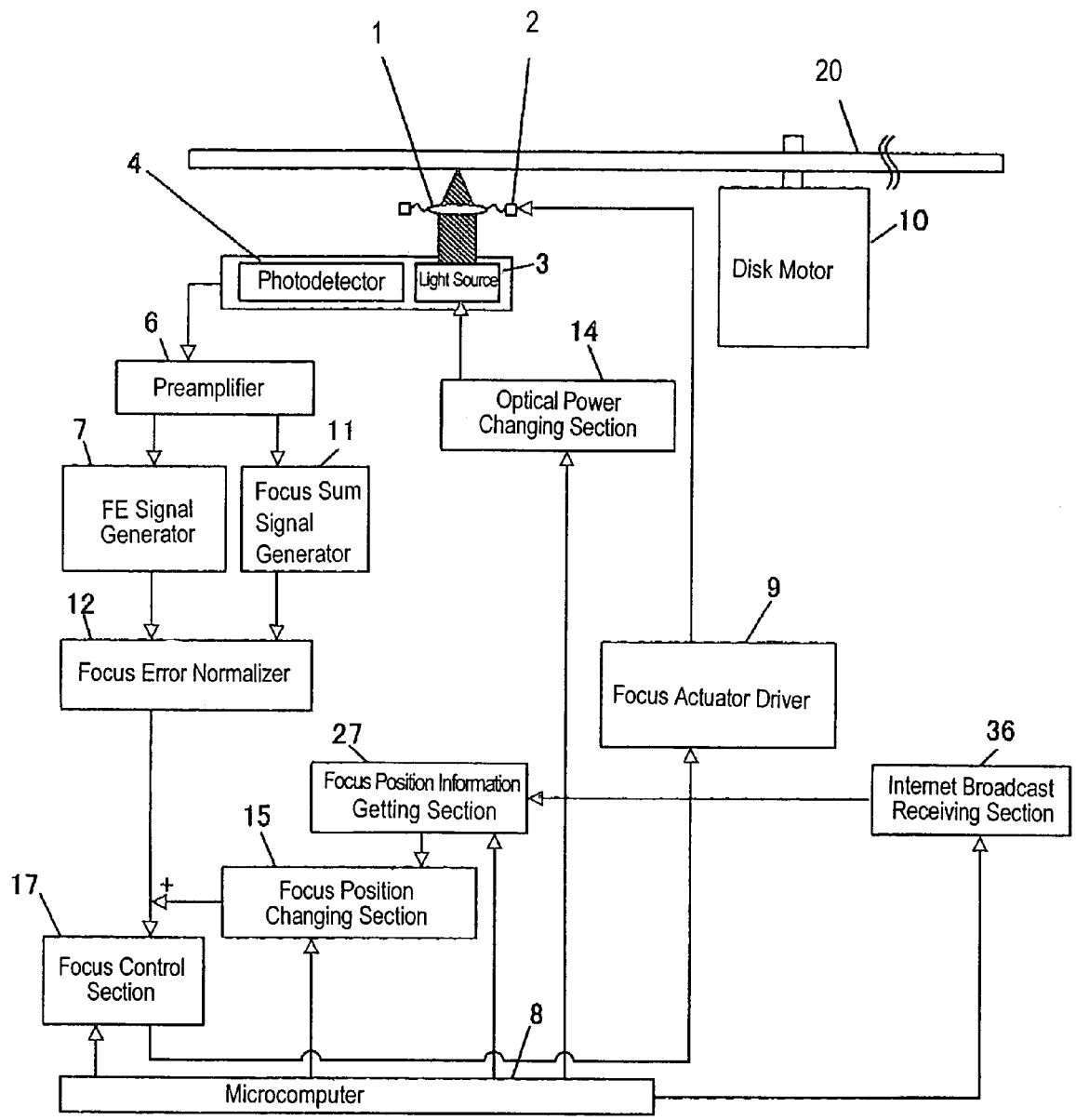

FIG. 8 is a block diagram showing an optical disk drive according to another modified example of the second preferred embodiment.

Figure 9:
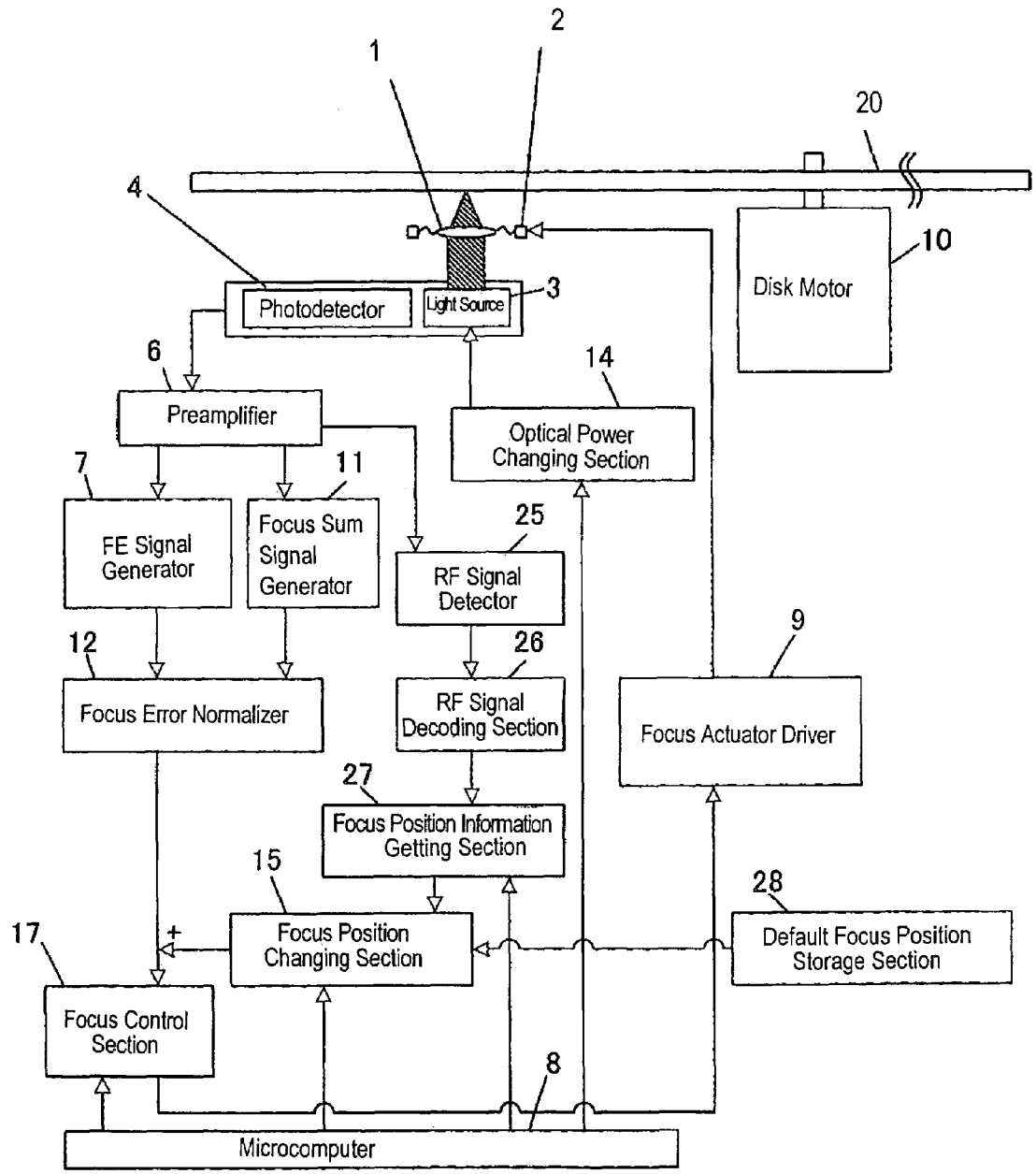

FIG. 9 is a block diagram showing an optical disk drive according to a third preferred embodiment of the present invention.

Figure 10:
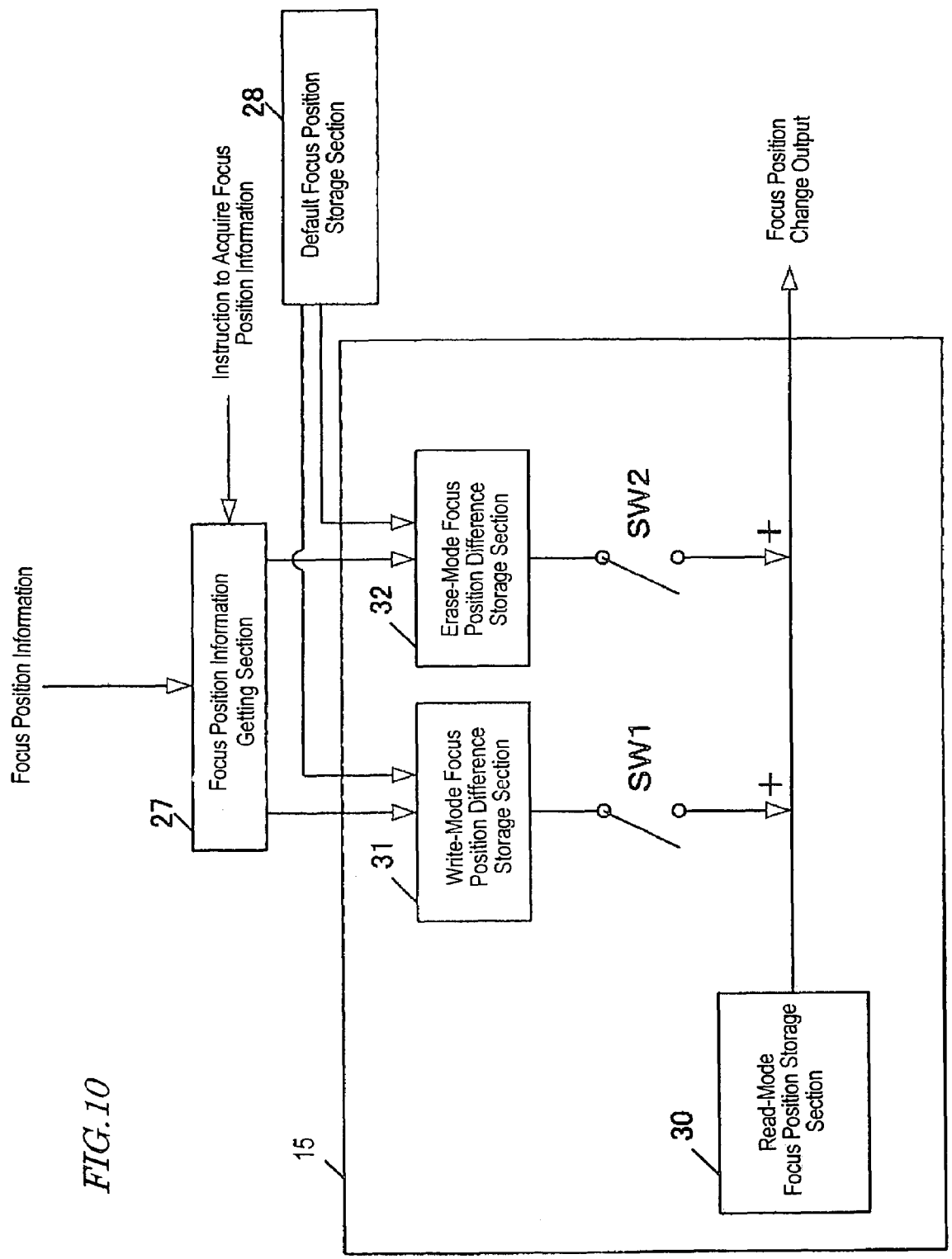

FIG. 10 is a block diagram showing a default focus position storage section, the focus position information getting section and the details of the focus position changing section.

Figure 11:
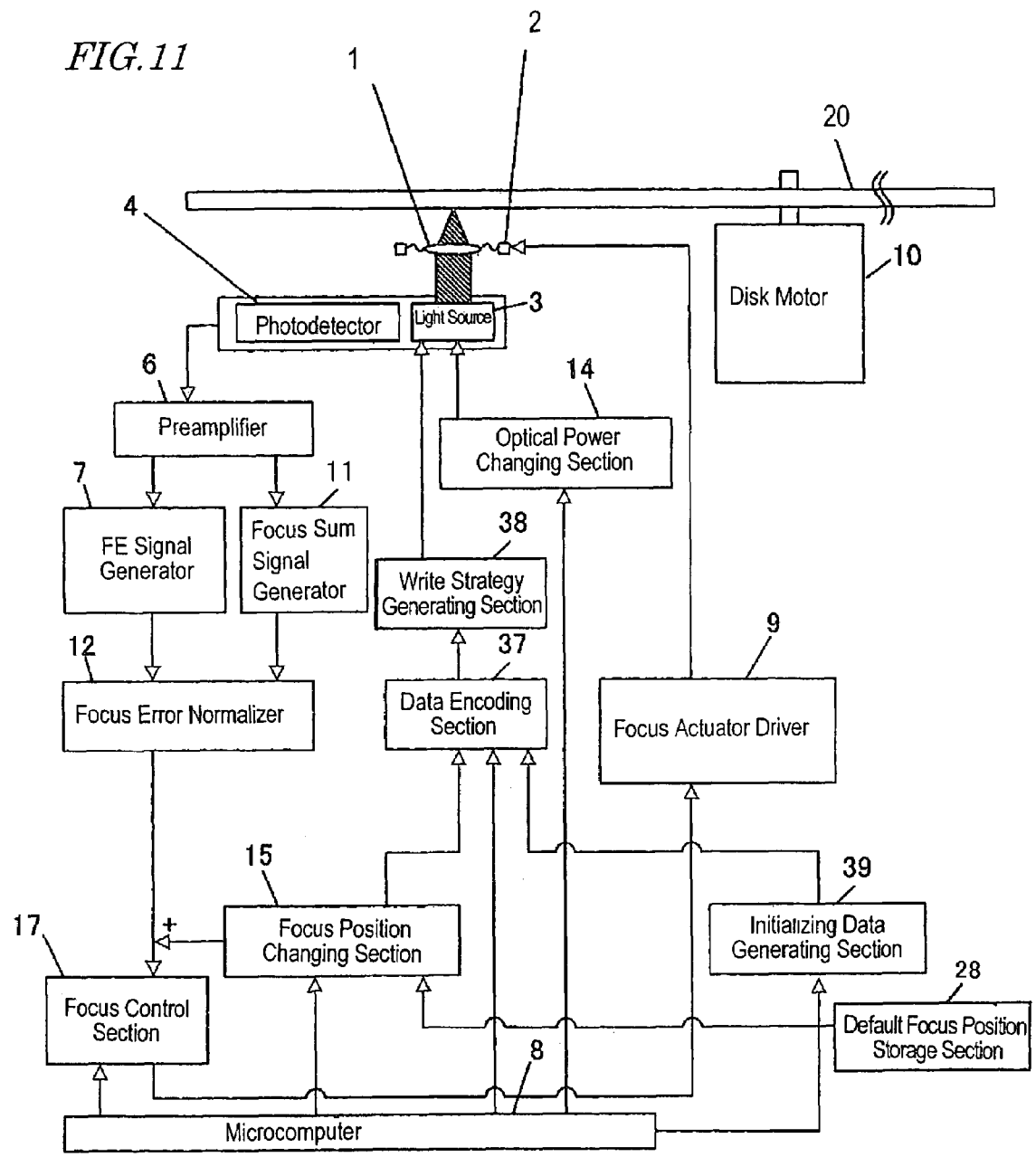

FIG. 11 is a block diagram showing an optical disk drive according to a fourth preferred embodiment of the present invention.

Figure 12:
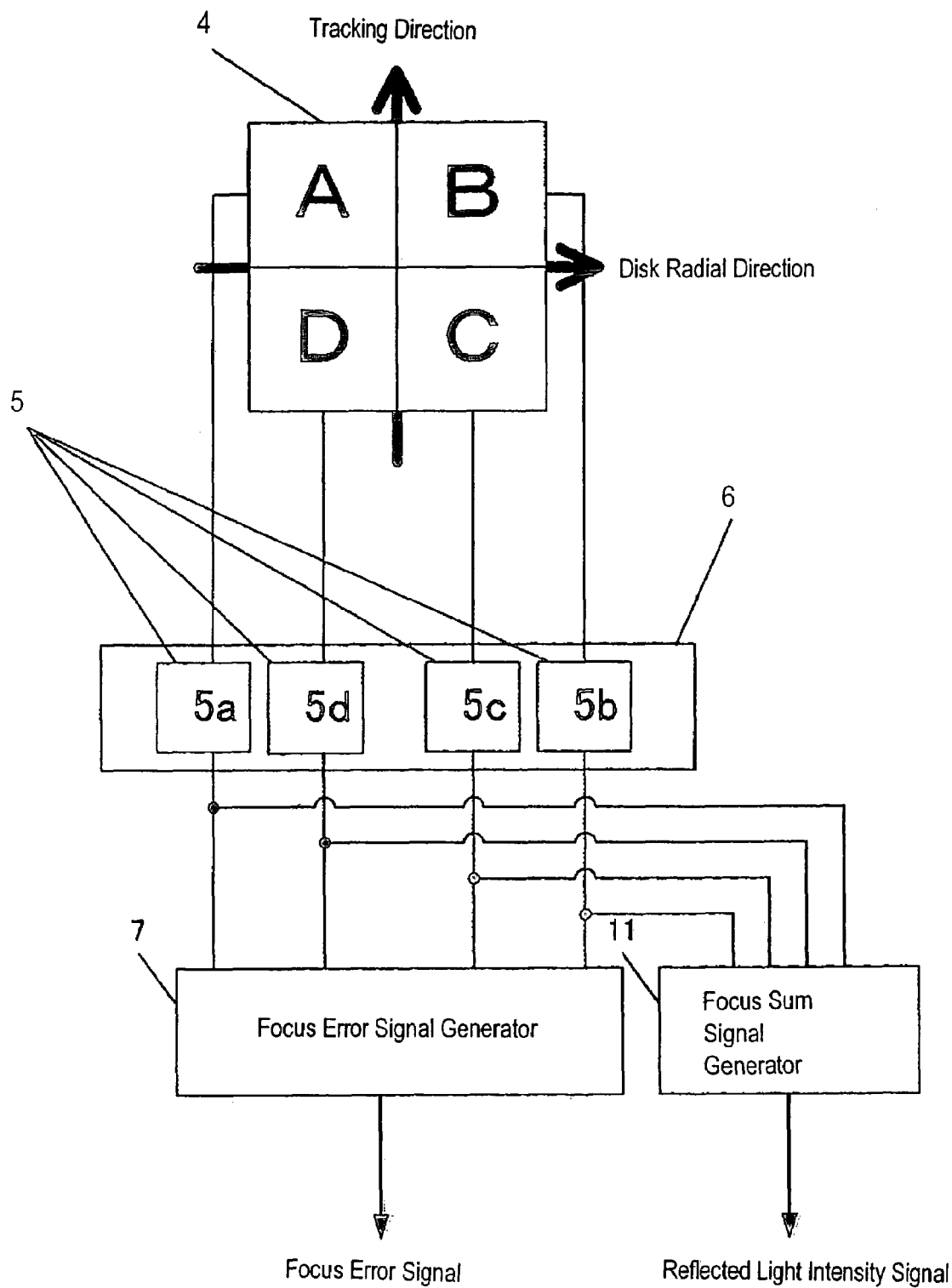

FIG. 12 is a block diagram showing the photodetector and the I/V converters in detail.

Figure 13:
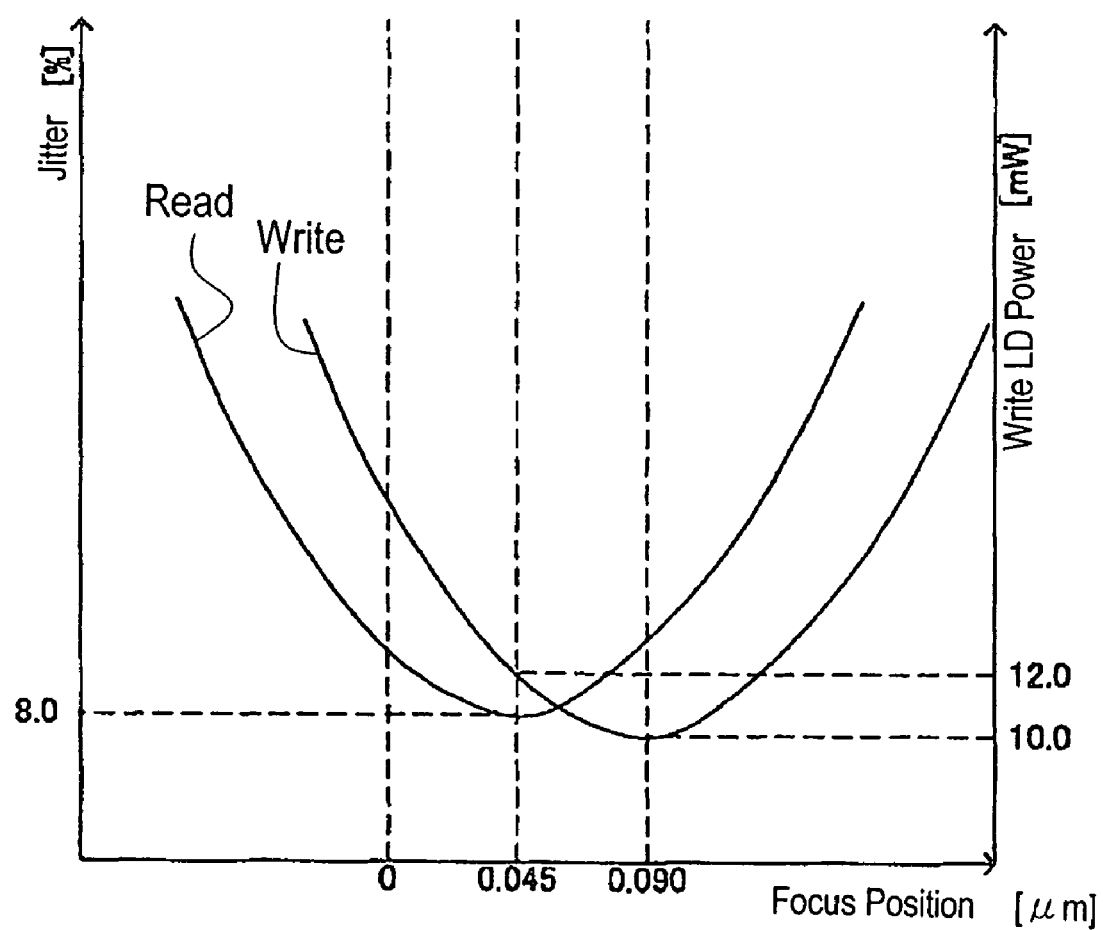

FIG. 13 shows how the best focus positions are different between the read mode and the write mode.

DETAILED DESCRIPTION OF PREFERRED EMBODIMENTS

First, it will be described how when an objective lens in an optical disk drive has a high NA, the respective modes of operation of read, write and erase have mutually different best focus positions.

FIG. 13 is a graph showing how the read performance changes with the axial focus position (FC) and how the write performance changes with the axial focus position in a BD with two information storage layers. In FIG. 13, the read performance is evaluated by the jitter of a read signal, while the write performance is evaluated by the power of a write laser beam (i.e., write LD power) that is required for obtaining a read signal of the same level.

In the BD used as a sample of measurement, a focus position where the read performance is optimized is located 0.045 µm away from a reference point, while a focus position where the write performance is optimized is located 0.090 µm away from the reference point. That is to say, there is a gap of 0.045 µm between these two focus positions. In that case, if data is written at the focus position where the read performance is optimized, the laser beam needs to have a power of about 12 mW. Meanwhile, if data is written at the focus position where the best write performance is achieved, the laser power needed for the write operation can be reduced to about 10 mW. If the power of the write laser beam can be cut down by as much as about 20% this way, then the load on a violet semiconductor laser diode for use as a laser light source for a BD can be lightened and its life can be extended effectively. A violet semiconductor laser diode is made of GaN based semiconductors and its reliability and life are still improvable more easily than semiconductor laser diodes operating at longer wavelengths. That is why such reduction in power for writing data contributes significantly to improving the reliability of an optical disk drive.

On top of that, if the best focus position can be found while data is being written, then a mark of appropriate shape and size can also be made on the storage layer. If the mark is deformed, then crosstalk will arise between adjacent tracks on an optical disk to deteriorate the read performance significantly. However, such deterioration can also be reduced by finding the best focus position.

These effects achieved by changing the focus positions when the modes of operation are switched from the read mode into any other mode are particularly significant if an optical system with a high NA and a short focal length is adopted. But those effects would have much less significance in an optical disk drive for a DVD.

Hereinafter, preferred embodiments of an optical disk drive according to the present invention will be described with reference to the accompanying drawings. However, the present invention is in no way limited to the following illustrative preferred embodiments.

Embodiment 1

Figure 1:
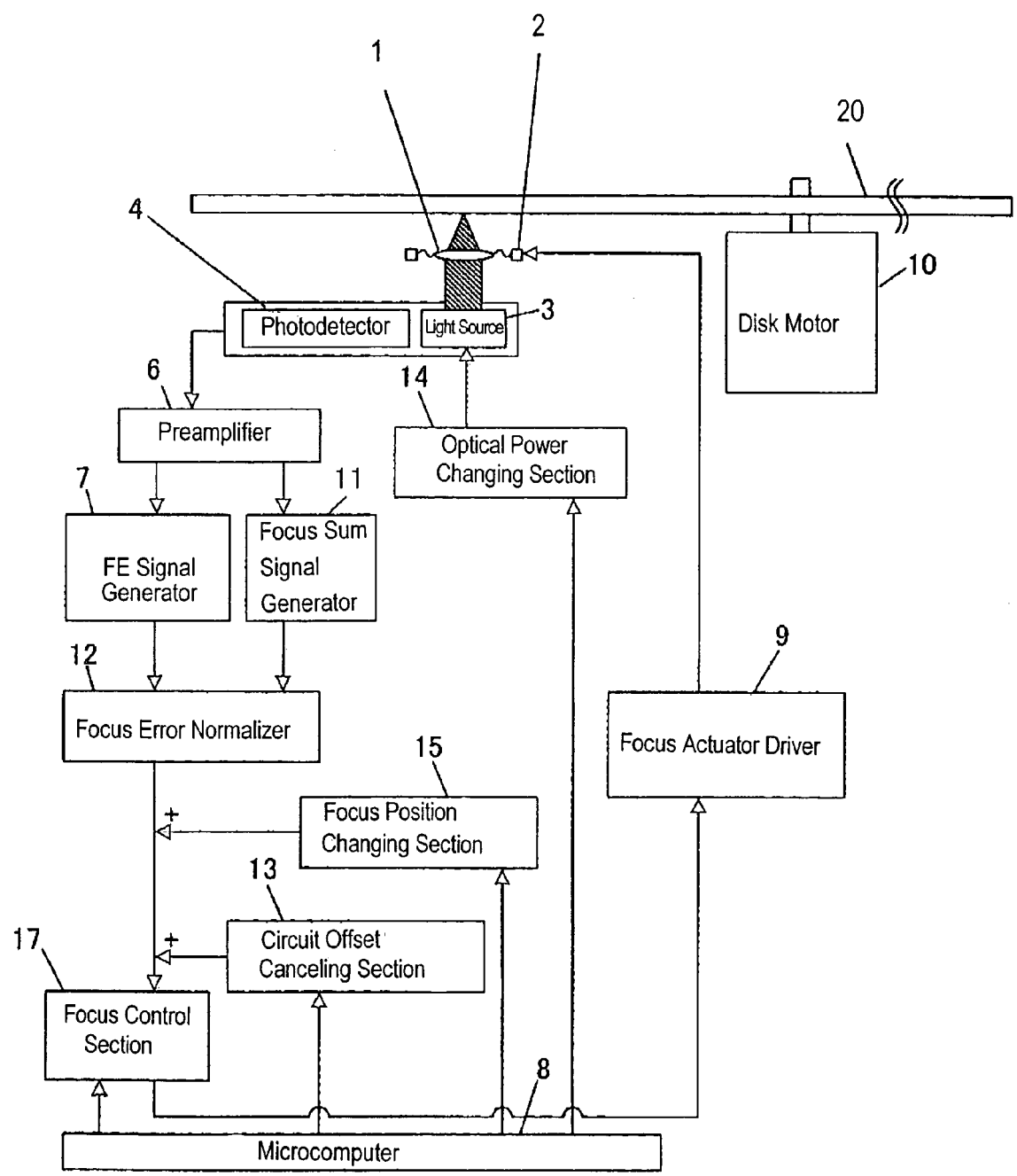
FIG. 1 is a block diagram showing an optical disk drive according to a first preferred embodiment of the present invention.

A first specific preferred embodiment of an optical disk drive according to the present invention will be 21, described with reference to FIGS. 1 to 3 and FIG. 12. FIG. 1 is a block diagram showing an optical disk drive according to the first preferred embodiment.

As shown in FIG. 1, the optical disk drive of this preferred embodiment preferably includes an objective lens 1, a focus actuator 2, a light source 3, a photodetector 4 and a preamplifier 6. The objective lens 1 is used for converging a light beam onto an information storage layer of an optical disk 20 as an exemplary information storage medium. The focus actuator 2 moves the objective lens 1 substantially perpendicularly to the information storage layer. The light source 3 may be a semiconductor laser diode, for example, and produces a laser beam. The photodetector 4 receives the light reflected from the optical disk 20 and generates a photocurrent in an amount corresponding to the optical intensity of the reflected light. And the preamplifier 6 converts the photocurrent into a voltage signal.

The light beam radiated from the light source 3 is converged by the objective lens 1 to form a light beam spot on the optical disk 20. The light beam is reflected by the information storage layer of the optical disk 20, passed through the objective lens 1, and then received at the quadruple photodetector 4 having four photosensitive areas. The photodetector 4 generates a photocurrent, of which the amount is determined by the quantities of light detected in those four photosensitive areas, and outputs it to the preamplifier 6. In response, the preamplifier 6 converts the incoming photocurrent into a voltage signal using I/V converters. The output voltage signal of the preamplifier 6 is supplied to a focus error signal generator 7 and a focus sum signal generator 11.

As shown in FIG. 12, the photodetector 4 includes four photosensitive areas A, B, C and D. The preamplifier 6 includes four I/V converters 5a, 5b, 5c and 5d, which are connected to the four photosensitive areas A, B, C and D, respectively. The quantities of light that have been detected in the areas A, B, C and D of the photodetector 4 correspond to the outputs of the I/V converters 5a, 5b, 5c and 5d, respectively. Each I/V converter 5 generates a voltage signal representing the optical intensity or quantity of incident light.

The optical disk drive of this preferred embodiment further includes the focus error signal generator 7, the focus sum signal generator 11, and a focus error normalizer 12. The focus error signal generator 7 generates a focus error signal representing the converging state of the light beam on the information storage layer. The focus sum signal generator 11 detects the intensity of the light reflected from the optical disk 20. And the focus error normalizer 12 normalizes the focus error signal with the intensity of the reflected light, thereby generating a normalized focus error signal.

The focus error signal generator 7 functions as converging state detecting means and generates a focus error signal representing the deviation between the focus position of the light beam and the information storage layer of the optical disk 20. The focus error signal generator 7 receives the output voltage signals of the I/V converters 5a, 5b, 5c and 5d and performs the following calculations on them. In the following description, the output voltage signals of the I/V converters 5a, 5b, 5c and 5d will be identified by V5a, V5b, V5c and V5d, respectively, for the sake of simplicity. Following this notation, the focus error signal generator 7 calculates (V5a+V5c)−(V5b+V5d) and outputs the result as a focus error signal by an astigmatism method.

The focus sum signal generator 11 generates a signal representing the intensity of the light beam that has been reflected from the optical disk 20 (such a signal will be referred to herein as a "focus sum signal"). More specifically, the focus sum signal generator 11 receives the output voltage signals of the I/V converters 5a, 5b, 5c and 5d, calculates the sum of these signals (i.e., V5a+V5b+V5c+V5d) and outputs the sum as the focus sum signal.

The focus error normalizer 12 normalizes the focus error signal supplied from the focus error signal generator 7 by the focus sum signal supplied from the focus sum signal generator 11. That is to say, the focus error normalizer 12 divides the focus error signal by the focus sum signal and outputs the result as a normalized focus error (FE) signal.

The optical disk drive of this preferred embodiment preferably further includes a circuit offset canceling section 13, a focus position changing section 15 and a focus control section 17. The circuit offset canceling section 13 cancels the circuit offset of the normalized FE signal. The focus position changing section 15 changes the target focus position of the normalized focus control. And the focus control section 17 performs a filter operation on the normalized FE signal.

The circuit offset canceling section 13 adds an offset to the normalized FE signal to cancel the circuit offset included in the normalized FE signal. The magnitude of the offset is set to an appropriate value according to each mode of operation (which may be one of the read, write and erase modes) and following the instruction of a microcomputer 8.

When the modes of operation are switched from the read mode into either the write mode or the erase mode, the focus position changing section 15 adds the magnitude of focus position change to the normalized FE signal that has been output by the focus error normalizer 12.

The focus position changing section 15 functions as the first stage portion of control target switching means, while the circuit offset canceling section 13 functions as the second stage portion of the control target switching means. After having had its offset canceled, the normalized FE signal is subjected to phase compensation, gain compensation and other filter operations by the focus control section 17 and then input to a focus actuator driver 9.

The focus control section 17 controls the operation of the focus actuator 2 by way of the focus actuator driver 9 such that the focus position of the light beam matches its target focus position as closely as possible. More particularly, the focus control section 17 moves the objective lens 1 substantially perpendicularly to the information storage layer of the optical disk 20 such that the light beam spot formed on the information storage layer of the optical disk 20 has a predetermined converging state. The focus actuator driver 9 supplies a drive signal (e.g., a voltage signal) to the focus actuator 2. In response to this drive signal, the focus actuator 2 changes the position of the objective lens 1.

The optical disk drive of this preferred embodiment preferably further includes a disk motor 10 for spinning the optical disk 20 and the microcomputer 8. The microcomputer 8 controls the circuit offset canceling section 13, optical power changing section 14, focus position changing section 15 and focus control section 17. The optical power changing section 14 functions as light optical power changing means and changes the optical power of laser light produced by the light source 3 in accordance with the instruction of the microcomputer 8.

Hereinafter, the operation of switching the read mode into the write mode will be described in detail with reference to FIG. 1 and portions (a) through (f) of FIG. 2.

Portion (a) of FIG. 2 is a cross-sectional view schematically illustrating the positions of the objective lens 1 with respect to the information storage layer 29 of the optical disk 20 during read, access and write operations. Portions (b) and (f) of FIG. 2 show the waveforms of respective signals contributing to these operations.

In the read mode, the objective lens 1 is located relatively close to the optical disk 20 as shown in portion (a) of FIG. 2. At this point in time, the normalized FE signal has a waveform such as that shown in portion (b) of FIG. 2. In accordance with the instruction of the microcomputer 8, the focus position changing section 15 now selects a focus position where the best read performance is achieved (which will be referred to herein as a "read-mode focus position"). Portion (c) of FIG. 2 shows a signal representing the read-mode focus position.

It should be noted that each of the FE signal and focus sum signal includes not only its own signal component to be detected but also an electrical offset produced by the circuit system. To nullify the unwanted effects caused by such an electrical offset of the circuit system in the read mode, the circuit offset canceling section 13 selects a read-mode offset and the optical power changing section 14 selects an optical power for read mode in accordance with the instruction of the microcomputer 8. The output of the circuit offset canceling section 13 is shown in portion (d) of FIG. 2, while that of the optical power changing section 14 is shown in portion (f) of FIG. 2. Portion (e) of FIG. 2 shows the waveform of a signal input to the focus control section 17 shown in FIG. 1.

At a time t1, which is just before the write operation is started, the microcomputer 8 instructs the focus position changing section 15 to select a target focus position for write mode. As a result, the output of the focus position changing section 15 changes as shown in portion (c) of FIG. 2 and the objective lens 1 moves from an axial position for reading to an axial position for writing as shown in portion (a) of FIG. 2. At the same time, the focus position of the light beam on the information storage layer 29 also shifts from the read-mode focus position to the write-mode focus position. In the meantime, the focus control section 17 is performing a feedback control such that the input to the focus control section becomes approximately equal to zero as shown in portion (e) of FIG. 2. As a result, the input to the focus control section becomes approximately equal to zero before and after the time t1. However, the normalized FE signal changes by the difference between the read- and write-mode focus positions before and after the time t1 as shown in portion (b) of FIG. 2.

Next, the microcomputer 8 gets the light beam spot shifted to the target track on the information storage layer 29. And as soon as the write operation is started, the microcomputer 8 instructs the optical power changing section 14 and circuit offset canceling section 13 to change their settings into those defined for write mode.

In accordance with the instruction of the microcomputer 8, the optical power changing section 14 increases the optical power or intensity of the light beam, being radiated by the light source 3, from a read-mode setting to a write-mode setting at a time t2 shown in portion (f) of FIG. 2. As the optical power of the light beam increases, the circuit offset included in the normalized FE signal varies. For that reason, in accordance with the instruction of the microcomputer 8, the circuit offset canceling section 13 switches the magnitudes of circuit offset from one for read mode into one for write mode the instant the quantities of the light beam are changed as shown in portion (d) of FIG. 2. At this point in time, however, the position of the objective lens 1 does not change before and after the write operation is started (i.e., before and after the time t2) as shown in portion (a) of FIG. 2. As a result, the write operation can be started with the focus position fixed immediately.

According to this preferred embodiment, since the input to the focus control section is not stepped at the time t2 as can be seen from portion (e) of FIG. 2, no overshoot is caused by the focus-control.

The length of the period between the times t1 and t2 is defined such that the spring vibration of the focus actuator 2 attenuates sufficiently as the objective lens 1 moves along its optical axis. The "t2-t1" period may have a length of 10 ms to 1,000 ms, for example.

Next, it will be described with reference to the flowchart of FIG. 3 how to switch modes.

In switching the read mode into the write mode, first, the microcomputer 8 instructs the focus position changing section 15 to change a read-mode focus position into a write-mode focus position in Step S1 shown in FIG. 3. Following this instruction, the focus position changing section 15 changes the focus positions from one for read mode to one for write mode at the time t1.

Next, in Step S2, the microcomputer 8 instructs to access a target track on the information storage layer 29, i.e., instructs that the focus position of the light beam be shifted onto the target track. Subsequently, in Step S3, the microcomputer 8 instructs the optical power changing section 14 to switch the quantities of light beam radiated from the light source 3 from one for read mode into one for write mode as soon as the focus position of the light beam reaches the target track, and the write operation is started at the time t2.

Thereafter, in Step S4, the microcomputer 8 instructs the circuit offset canceling section 13 to switch the magnitudes of circuit offset from one for read mode into one for write mode. As a result, as soon as the write operation is started (i.e., right after the time t2), the focus control can be stabilized and signals of quality can be written on the optical disk 20 with high reliability.

The operations to be done in switching the read mode into the erase mode are similar to those to be done in switching the read mode into the write mode. Optionally, the write mode and the erase mode may be combined into a single mode.

As described above, according to this preferred embodiment, the write or erase operation can be carried out at a target focus position that achieves the highest write performance with the shift in focus position minimized at the start of the write operation. As a result, both high-reliability read performance and high-quality-signal writing and erasing performances are realized at the same time.

Optionally, the focus position changing section 15 may define the target focus position for write mode and the target focus position for erase mode with respect to the target focus position for read mode. In that case, the focus position changing section 15 just needs to make a correction to the read-mode focus position. As a result, the target focus position change can be simplified and can be done more quickly.

Next, the configuration of the focus position changing section 15 will be described in detail with reference to FIG. 4, which is a block diagram showing the detailed configuration of the focus position changing section 15.

As shown in FIG. 4, the focus position changing section 15 includes a read-mode focus position storage section 30, a write-mode focus position difference storage section 31 and an erase-mode focus position difference storage section 32. These storage sections 30, 31 and 32 may be three different storage areas of a single memory.

The read-mode focus position storage section 30 stores a read-mode focus position, which is the best focus position for read mode. The write-mode focus position difference storage section 31 stores the difference between a write-mode focus position, which is the best focus position for write mode, and the read-mode focus position. The erase-mode focus position difference storage section 32 stores the difference between an erase-mode focus position, which is the best focus position for erase mode, and the read-mode focus position. The magnitudes of these differences may be about 0 µm to about 0.2 µm, for example.

In the read mode, the switches SW1 and SW2 of the focus position changing section 15 are in OFF state so that the read-mode focus position, which is stored in the read-mode focus position storage section 30, is output from the focus position changing section 15.

In the write mode, the switches SW1 and SW2 of the focus position changing section 15 are in ON state and in OFF state, respectively, so that the read-mode focus position, which is stored in the read-mode focus position storage section 30, and the value stored in the write-mode focus position difference storage section 31 are added together and that the sum is output as a write-mode focus position from the focus position changing section 15.

In the erase mode, the switches SW1 and SW2 of the focus position changing section 15 are in OFF state and in ON state, respectively, so that the read-mode focus position, which is stored in the read-mode focus position storage section 30, and the value stored in the erase-mode focus position difference storage section 32 are added together and that the sum is output as an erase-mode focus position from the focus position changing section 15. Optionally, either the write-mode focus position difference storage section 31 or the erase-mode focus position difference storage section 32 may be omitted such that the same focus position difference storage section is used in common for both the write and erase modes alike.

Then, just by making a correction to the read-mode focus position that is stored in the read-mode focus position storage section 30, the write-mode and erase-mode focus positions can be defined in accordance with the change of the read-mode focus position. Consequently, the focus position calibration process can be carried out quickly.

The positional relationship between the target focus position where the read performance is optimized and the target focus position where the write performance is optimized changes with the material and structure of the optical disk 20. That is why the value stored in the write-mode focus position difference storage section 31 and the value stored in the erase-mode focus position difference storage section 32 may be switched for respective optical disks of mutually different materials or structures. Alternatively, those quantities may be fixed values adopted for a typical optical disk 20.

If the optical disk 20 is a BD, then the target focus position where the write performance is optimized is closer to the light incident side of the optical disk 20 by about 0 µm to about 0.2 µm than the target focus position where the read performance is optimized is. In this preferred embodiment, the target focus positions like these are changed by correcting the normalized FE signal to be supplied to the focus control section 17. That is why the focus positions can be easily changed by modifying a software program.

Optionally, by sensing indirectly the difference in the material or structure of the optical disks 20 from the information about track wobbles or pits on the information storage layers 29 of the optical disks 20, the quantities stored in the write-mode and erase-mode focus position difference storage sections 31 and 32 may be switched. For example, a normal rewritable optical disk stores a write strategy, which is a waveform typically used in writing some information on that disk, as either wobble information or pit information on its inner disk information area. Thus, by detecting that write strategy stored, the disk can be identified and the quantities stored in the write-mode and erase-mode focus position difference storage sections 31 and 32 can be changed into those determined in advance for that disk. As a result, it is possible to provide an optical disk drive that can set the write-mode and erase-mode focus positions quickly and appropriately even if the material or structure of the optical disk 20 has changed.

As another alternative, the optical disk drive may also be designed so as to change the conversion gains of the I/V converters 5 in the preamplifier 6 as the optical power of the light beam emitted from the light source 3 is changed by the optical power changing section 14. Then, the output signal of the preamplifier 6 can be limited to a predetermined range and the detection range of a D/A converter, for example, may be narrowed. Alternatively, an analog circuit may be designed so as to have a low drive voltage. As a result, an optical disk drive contributing to cost reduction or power saving can be provided.

Embodiment 2

Hereinafter, a second specific preferred embodiment of an optical disk drive according to the present invention will be described with reference to FIGS. 5 and 6.

First, referring to FIG. 5, illustrated is a block diagram showing an optical disk drive according to this preferred embodiment. In FIG. 5, any component of the optical disk drive, having the same function as the counterpart of the optical disk drive of the first preferred embodiment described above, is identified by the same reference numeral and the description thereof will be omitted herein.

As shown in FIG. 5, the optical disk drive of this preferred embodiment includes an RF signal detector 25, an RF signal decoding section 26 and a focus position information getting section 27.

The RF signal detector 25 detects an RF signal, which is a piece of information stored in the information storage layer of the optical disk. The RF signal decoding section 26 decodes the RF signal into the original information. The focus position information getting section 27 gets and updates either or both of the write-mode and erase-mode focus positions.

Next, referring to FIG. 6, illustrated is a block diagram showing the focus position information getting section 37 and the details of the focus position changing section 15.

As shown in FIG. 6, the read-mode focus position storage section 30 saves a read-mode focus position, which is the best focus position for read mode. The write-mode focus position difference storage section 31 saves the difference between a write-mode focus position, which is the best focus position for write mode, and the read-mode focus position. The erase-mode focus position difference storage section 32 saves the difference between an erase-mode focus position, which is the best focus position for erase mode, and the read-mode focus position.

Referring back to FIG. 5, the light beam produced by the light source 3 is converged by the objective lens 1, thereby forming a light beam spot on the information storage layer of the optical disk 20. The light reflected from this light beam spot on the optical disk 20 is passed through the objective lens 1 again and then received at the photodetector 4. The photodetector 4, preamplifier 6, focus error signal generator 7, focus sum signal generator 11, focus error normalizer 12, focus control section 17, objective lens 1, focus actuator driver 9 and focus actuator 2 operate just as already described for the first preferred embodiment.

The RF signal detector 25 calculates $V5a+V5c+V5b+V5d$ based on the output voltage signals of the I/V converters $5a$, $5b$, $5c$ and $5d$. In this case, the RF signal detector 25 generates an RF signal by removing signal components, of which the frequencies are lower than the intended frequency range (e.g., signal components with frequencies of 50 kHz or less).

The RF signal decoding section 26 receives the RF signal, subjects it to digitization and error correction, and then converts the RF signal to digital information. In accordance with the instruction of the microcomputer 8, the focus position information getting section 27 extracts focus position information from the digital information provided from the RF signal decoding section 26. Then, based on the focus position information, the focus position information getting section 27 updates the write-mode and erase-mode focus position differences of the focus position changing section 15.

Referring back to FIG. 6, the focus position information getting section 27 gets the focus position information from the RF signal decoding section 26 following the microcomputer's instruction to get focus position information. Then, the focus position information getting section 27 updates the write-mode and erase-mode focus position differences that are respectively stored in the write-mode and erase-mode focus position difference storage sections 31 and 32 in the focus position changing-section 15. Optionally, the write-mode and erase-mode focus positions may be combined into one for the purpose of simplification.

As shown in FIG. 6, in the read mode, the switches SW1 and SW2 of the focus position changing section 15 are in OFF state so that the read-mode focus position, which is stored in the read-mode focus position storage section 30, is output from the focus position changing section 15.

In the write mode, the switches SW1 and SW2 of the focus position changing section 15 are in ON state and in OFF state, respectively, so that the read-mode focus position, which is stored in the read-mode focus position storage section 30, and the value stored in the write-mode focus position difference storage section 31 are added together and that the sum is output as a write-mode focus position from the focus position changing section 15.

In the erase mode, the switches SW1 and SW2 of the focus position changing section 15 are in OFF state and in ON state, respectively, so that the read-mode focus position, which is stored in the read-mode focus position storage section 30, and the value stored in the erase-mode focus position difference storage section 32 are added together and that the sum is output as an erase-mode focus position from the focus position changing section 15. Optionally, either the write-mode focus position difference storage section 31 or the erase-mode focus position difference storage section 32 may be omitted such that the same focus position difference storage section is used in common for both the write and erase modes alike.

Thus, the write-mode or erase-mode focus position can be updated into a newest one at any time by using an optical disk on which data for update is stored. Accordingly, even if a brand-new type of optical disk is put on the market, a provider of optical disk drives can also provide a compatible optical disk drive by providing an optical disk on which the data for update is stored. As a result, by getting such an optical disk storing the data for update from a provider of optical disks, the user can update his or her optical disk drive into one that is compatible with more types of optical disks both easily and at a reduced cost.

Modified Example of Embodiment 2

FIG. 7 is a block diagram showing an optical disk drive, which is a version of the optical disk drive of the second preferred embodiment that has been modified such that the target focus positions can be updated by a semiconductor memory.

The optical disk drive shown in FIG. 7 includes a semiconductor memory reading section 35. By adopting such a configuration, the write-mode or erase-mode focus position can be updated by the semiconductor memory.

In the optical disk drive shown in FIG. 7, the semiconductor memory reading section 35 reads out information from a semiconductor memory (not shown) in accordance with the instruction of the microcomputer 8. Also following the instruction of the microcomputer 8, the focus position information getting section 27 gets the focus position information from the semiconductor memory reading section 35 and updates the write-mode and erase-mode focus position differences of the focus position changing section 15.

As a result, the write-mode or erase-mode focus position can be updated on any type of information storage medium that the user needs and even the newest type of optical disk can be coped with at any time. Optionally, the semiconductor memory reading section 35 may be replaced with any other type of information storage medium reading section such that the write-mode or erase-mode focus position can be updated on its associated type of information storage medium.

FIG. 8 illustrates another modified example.

The optical disk drive shown in FIG. 8 includes an Internet broadcast receiving section 36. In accordance with the instruction of the microcomputer 8, the Internet broadcast receiving section 36 receives information that has been downloaded from a base station over the Internet. Also following the instruction of the microcomputer 8, the focus position information getting section 27 gets the focus position information from the Internet broadcast receiving section 36 and updates the write-mode and erase-mode focus position differences of the focus position changing section 15.

In this manner, the write-mode or erase-mode focus position can be updated without using any optical disk. That is to say, no information storage medium needs to be prepared for the purpose of updating the write-mode or erase-mode focus position. As a result, the user can also save the time and cost of purchasing and maintaining an information storage medium for updating the write-mode or erase-mode focus position.

Alternatively, the Internet broadcast receiving section 36 shown in FIG. 8 may be replaced with a radio wave receiving section for receiving a terrestrial or satellite broadcast radio wave and an optical disk drive that can update the write-mode or erase-mode focus position via a radio wave and an electromagnetic wave may be provided, too.

The focus position information may be gotten as control data, including other types of data, from a semiconductor memory or over the Internet, for example. Optionally, when firmware for an optical disk drive is read out from another storage medium, downloaded over the Internet, or received as a radio wave from a base station, such control data may be gotten along with the firmware program.

Embodiment 3

A third specific preferred embodiment of an optical disk drive according to the present invention will be described with reference to FIGS. 9 and 10.

FIG. 9 is a block diagram showing an optical disk drive according to this third preferred embodiment. As shown in FIG. 9, the optical disk drive of this preferred embodiment includes a default focus position storage section 28. The default focus position storage section 28 saves a default value of the write-mode or erase-mode focus position. FIG. 10 is a block diagram showing the default focus position storage section 28, focus position information getting section 27 and the details of the focus position changing section 15.

First, referring to FIG. 9, the default focus position storage section 28 sets the write-mode and erase-mode focus positions for the focus position changing section 15 only once (e.g., when the optical disk drive is started or loaded with the optical disk 20).

The light beam radiated from the light source 3 is converged by the objective lens 1 to form a light beam spot on the information storage layer of the optical disk 20. The light beam is reflected by the optical disk 20, passed through the objective lens 1, and then received at the quadruple photodetector 4 having four photosensitive areas. The photodetector 4 generates a photocurrent, of which the amount is determined by the quantities of light detected in those four photosensitive areas, and outputs it to the preamplifier 6. In response, the preamplifier 6 converts the incoming photocurrent into voltage signals using I/V converters. The output voltage signals of the preamplifier 6 are supplied to a focus error signal generator 7 and a focus sum signal generator 11.

The photodetector 4, preamplifier 6, focus error signal generator 7, focus sum signal generator 11, focus error normalizer 12, focus control section 17, objective lens 1, focus actuator driver 9, focus actuator 2, RF signal detector 25, RF signal decoding section 26 and focus position information getting section 27 operate just as already described for the first and second preferred embodiments.

Next, the default focus position storage section 28, focus position information getting section 27 and focus position changing section 15 will be described with reference to FIG. 10.

The default focus position storage section 28 sets the write-mode and erase-mode focus positions for the write-mode focus position difference storage section 31 and erase-mode focus position difference storage section 32, respectively, in the focus position changing section 15 only once (e.g., when the optical disk drive is booted or loaded with the optical disk 20).

Next, if it turns out that the information about the write-mode or erase-mode focus position is stored in the information storage layer 29 of the optical disk 20 when the) information storage layer 29 is read, the focus position information getting section 27 gets the focus position information from the RF signal decoding section 26 in accordance with the microcomputer's instruction to get the focus position information. Then, the focus position information getting section 27 updates the write-mode and erase-mode focus position differences that are respectively stored in the write-mode and erase-mode focus position difference storage sections 31 and 32 in the focus position changing section 15. Optionally, the write-mode and erase-mode focus positions may be combined into a single target focus position for the purpose of simplification.

In the read mode, the switches SW1 and SW2 of the focus position changing section 15 are in OFF state so that the read-mode focus position, which is stored in the read-mode focus position storage section 30, is output from the focus position changing section 15.

In the write mode, the switches SW1 and SW2 of the focus position changing section 15 are in ON state and in OFF state, respectively, so that the read-mode focus position, which is stored in the read-mode focus position storage section 30, and the value stored in the write-mode focus position difference storage section 31 are added together and that the sum is output as a write-mode focus position from the focus position changing section 15.

In the erase mode, the switches SW1 and SW2 of the focus position changing section 15 are in OFF state and in ON state, respectively, so that the read-mode focus position, which is stored in the read-mode focus position storage section 30, and the value stored in the erase-mode focus position difference storage section 32 are added together and that the sum is output as an erase-mode focus position from the focus position changing section 15. Optionally, either the write-mode focus position difference storage section 31 or the erase-mode focus position difference storage section 32 may be omitted such that the same focus position difference storage section is used in common for both the write and erase modes alike.

In this manner, the write-mode and erase-mode focus position information stored may be used for an optical disk on which data for update is stored. Thus, the write-mode and erase-mode focus positions may be optimized without adjusting them by tentatively writing and reading data on/from the optical disk.

This method is particularly effectively applicable to a write-once medium, on which data may not be written more than once, because the recordable area thereof is not consumed. Consequently, an optical disk drive that can control the write-mode and erase-mode focus positions to best ones for each individual disk without tentatively writing information thereon can be provided.

Embodiment 4

Hereinafter, a fourth specific preferred embodiment of an optical disk drive according to the present invention will be described with reference to FIG. 11, which is a block diagram showing an optical disk drive according to the fourth preferred embodiment.

The data encoding section 37 shown in FIG. 11 encodes the focus position information and adds error correction information. The write strategy generating section 38 generates a write strategy from data and controls the light source.

The default focus position storage section 28 sets the write-mode and erase-mode focus positions for the focus position changing section 15 only once (e.g., when the optical disk drive is booted or loaded with the optical disk 20). In this case, the default focus position storage section 28 may perform a test write operation on the optical disk with the focus positions changed and find the best focus position by learning (i.e., by checking the read signals). However, if the focus position information is already stored on the optical disk inserted, then there is no need to carry out such a learning operation. Optionally, the default focus position storage section 28 may update the focus position information in accordance with the newest focus position information that has been either read out from a semiconductor memory or downloaded over the Internet as in the second preferred embodiment described above.

The initializing data generating section 39 generates data for logically initializing the information storage layer of the optical disk.

The light beam radiated from the light source 3 is converged by the objective lens 1 to form a light beam spot on the information storage layer of the optical disk 20. The light beam is reflected by the optical disk 20, passed through the objective lens 1, and then received at the quadruple photodetector 4 having four photosensitive areas. The photodetector 4 generates a photocurrent, of which the amount is determined by the quantities of light detected in those four photosensitive areas, and outputs it to the preamplifier 6. In response, the preamplifier 6 converts the incoming photocurrent into voltage signals using I/V converters. The output voltage signals of the preamplifier 6 are supplied to a focus error signal generator 7 and a focus sum signal generator 11.

The photodetector 4, preamplifier 6, focus error signal generator 7, focus sum signal generator 11, focus error normalizer 12, focus control section 17, objective lens 1, focus actuator driver 9, and focus actuator 2 operate just as already described for the first preferred embodiment, and the description thereof will be omitted herein.

To store information about current write-mode and erase-mode focus positions on the optical disk 20, the microcomputer 8 instructs the data encoding section 37 to store the target focus positions. In response, the data encoding section 37 acquires information about the write-mode and erase-mode focus positions from the focus position changing section 15, encodes that information, and adds error correction information thereto. The write strategy generating section 38 gets the data to store from the data encoding section 37 and generates a write strategy. The write strategy generating section 38 activates the light source 3 according to the write strategy generated, thereby storing the current write-mode and erase-mode focus positions on the optical disk 20.

In this case, when the write strategy generating section 38 activates the light source 3, the microcomputer 8 instructs the optical power changing section 14 to change the optical power into one for write mode. Following the instruction of the microcomputer 8, the optical power changing section 14 changes the optical power of the light source 3 into one for write mode, thereby getting the write operation started.

As a result, the information about the target focus positions during the write and erase operations can be stored on the optical disk 20. That is why if an optical disk on which such write-mode and erase-mode focus position information has already been stored is used, then the focus position information can be directly read out from the optical disk just by inserting the optical disk into the optical disk drive. And if the focus position information can be retrieved from the optical disk in this manner, then there is no need to perform the operation of determining the focus position information by tentatively and repeatedly writing on, and reading from, every optical disk inserted into the optical disk drive.

Among other things, if a write-once optical disk, on which data may not be written more than once, were subjected to a test write operation for the purpose of finding the best focus position, then the user data area thereof would be consumed and decreased. According to this preferred embodiment, however, such a problem can be avoided. Thus, this preferred embodiment can not only reduce the number of times the test write operation should be done but also simplify the booting process and shorten the time it takes to boot the optical disk drive if the given optical disk stores the focus position information thereon. It should be noted that the write-mode and erase-mode focus position information do not have to have mutually different values but may have a single common value.

In initializing the optical disk 20, first, the microcomputer 8 gives an initializing instruction to the initializing data generating section 39 functioning as initializing means. As used herein, to "initialize" refers to the work of writing necessary data on the optical disk 20 so that the file system can use the optical disk 20.

The initializing data generating section 39 outputs the initialing data generated to the data encoding section 37. In response, the data encoding section 37 encodes the initializing data received and adds error correction information thereto. The write strategy generating section 38 gets the processed initializing data from the data encoding section 37, thereby generating a write strategy.

The write strategy generating section 38 activates the light source 3 according to the write strategy generated, thereby storing the current write-mode and erase-mode focus positions on the optical disk 20.

In this manner, the write-mode and erase-mode focus position information is stored on the optical disk being initialized. Thus, compared to storing the write-mode and erase-mode focus position information on an optical disk from/on which data is being read or written, the processing can be done more easily.

Optionally, the product ID information of the optical disk drive, as well as the write-mode and erase-mode focus position information, may be additionally stored on the optical disk. Then, even if the same optical disk is used in a plurality of optical disk drives, the optical disk drive can retrieve a required piece of information from multiple sets of write-mode and erase-mode focus position information by reading the product ID information.

Alternatively, the write-mode and erase-mode focus position information may be stored along with its information saving date and time. Then, the optical disk drive can retrieve the newest piece of write-mode and erase-mode focus position information from multiple sets of write-mode and erase-mode focus position information.

As another alternative, the write-mode and erase-mode focus position information may be accompanied with information about the temperature when the same information was stored. Then, the optical disk drive can retrieve the best piece of write-mode and erase-mode focus position information for the current ambient temperature from multiple sets of write-mode and erase-mode focus position information.

In an optical disk drive according to any of the preferred embodiments of the present invention described above, the focus position information getting section, focus control section and other components may be implemented by hardware but may also be implemented by either software or a combination of hardware and software.

The present invention can be carried out by modifying a part of a software program for controlling the operation of driving an optical disk drive. An electronic component including such a software program may be manufactured and put on sale as a processor for optical disk drives.

In an optical disk drive according to a preferred embodiment of the present invention, the focus positions are changed non-synchronously with the switch of the quantities of light beam. Thus, the write or erase operation can be carried out at a target focus position where the best write performance is achieved with the shift of the focus position, which would otherwise be often produced at the beginning of a write operation, minimized. Consequently, high-reliability read performance and high-quality signal writing and erasing performances are achieved at the same time.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2004-221326 filed Jul. 29, 2004 and No. 2005-212665 filed Jul. 22, 2005, the entire contents of which are hereby incorporated by reference.

What is claimed is:

1. An optical disk drive comprising:
a light source for producing a light beam;
an objective lens for converging the light beam;
an actuator for moving the objective lens with respect to an optical disk;
converging state detecting means for generating a focus error signal representing a converging state of the light beam on an information storage layer of the optical disk;
a focus position changing means for changing information about a target focus position of the light beam when modes of operation are switched between a read mode and a write mode, the target focus position of the light beam being defined relative to the information storage layer of the optical disk;
a circuit offset canceling section for adding a read mode offset signal onto the focus error signal so as to cancel a read mode electrical offset that is produced in the read mode, and adding a write mode offset signal onto the focus error signal so as to cancel a write mode electrical offset that is produced in the write mode;
focus control means for controlling the operation of the actuator such that the focus position of the light beam matches its target focus position of the light beam as closely as possible in accordance with information about the target focus position and the focus error signal, the focus position of the light beam being defined relative to the information storage layer of the optical disk,
wherein the target focus position of the light beam includes a first target focus position for the read mode and a second target focus position for the write mode, the first target focus position being different from the second target focus position,
wherein the focus control means sets the focus position of the light beam to the first target focus position in the read mode and to the second target focus position in the write mode, respectively.

2. The optical disk drive of claim 1, wherein when the modes of operation are switched from the read to write modes, the quantities of the light beam are changed after the focus control means changes the focus position of the light beam from the first target focus position to the second target focus position, and then writing data is conducted at the second target focus position.

3. The optical disk drive of claim 1, wherein an optical system of the optical disk drive has a higher NA (Numerical Aperture) than that for a DVD.

4. The optical disk drive of claim 1, further comprising light beam intensity changing means for changing the quantities of the light beam,
wherein when the light beam intensity changing means changes the quantities of the light beam from one for the read mode into either one for the write mode or one for the erase mode, the focus position changing means changes the information about the target focus position for the read mode into either information for the write mode or information for the erase mode, and
wherein the light beam intensity changing means changes the quantities of the light beam after the information about the target focus position has been changed.

5. The optical disk drive of claim 4, wherein the focus position changing means includes: a first storage section for storing a read-mode focus position; a second storage section for storing a first value of difference between the read-mode focus position and a write-mode focus position; and a third storage section for storing a second value of difference between the read-mode focus position and an erase-mode focus position, and
wherein in outputting the focus position information for the read mode, the optical disk drive outputs the read-mode focus position; in outputting the focus position information for the write mode, the optical disk drive adds the first value of difference to the read-mode focus position and then outputs the sum; and in outputting the focus position information for the erase mode, the optical disk drive adds the second value of difference to the read-mode focus position and then outputs the sum.

6. The optical disk drive of claim 5, wherein the first and second quantities of differences change their values with recording properties of the optical disk.

7. The optical disk drive of claim 5, wherein the first and second quantities of differences are updated in accordance with information that is stored on the optical disk.

8. The optical disk drive of claim 1, further comprising light beam intensity changing means for changing the quantities of the light beam,
wherein after the focus position changing means has changed the information about the target focus position and before the quantities of the light beam are changed, the objective lens is moved toward a target recording location on the optical disk.

9. The optical disk drive of claim 1, further comprising a focus position information getting section for getting the focus position information from outside of the optical disk drive.

10. The optical disk drive of claim 9, wherein the focus position information getting section extracts the focus position information from data that is stored on the optical disk.

11. The optical disk drive of claim 9, wherein the focus position information getting section gets the focus position information that has been either downloaded over the Internet or received as a radio wave from a base station.

12. The optical disk drive of claim 1, wherein the optical disk drive determines the target focus position by learning.

13. The optical disk drive of claim 6, wherein the first and second quantities of differences are updated in accordance with information that is stored on the optical disk.

14. An optical disk drive comprising:
a light source for producing a light beam;
an objective lens for converging the light beam;
an actuator for moving the objective lens with respect to an optical disk;
converging state detecting means for generating a focus error signal representing a converging state of the light beam on an information storage layer of the optical disk; and
focus control means for controlling the operation of the actuator such that the focus position of the light beam matches its target focus position of the light beam as closely as possible in accordance with information about the target focus position and the focus error signal, the focus position and the target focus position of the light beam being defined relative to the information storage layer of the optical disk,
wherein the optical disk drive changes the target focus positions of the light beam when modes of operation are switched between a read mode and a write mode,
wherein the target focus positions of the light beam include a first target focus position for the read mode and a second target focus position for the write mode, and wherein the focus control means sets the focus position of the light beam to the first target focus position in the read mode and to the second target focus position in the write mode, respectively, wherein the target focus positions of the light beam further include a third target focus position for an erase mode, and wherein the focus control means sets the focus position of the light beam to the third target focus position in the erase mode.

15. A method for driving an optical disk drive, the optical disk drive including: a light source for producing a light beam; an objective lens for converging the light beam; an actuator for moving the objective lens with respect to an optical disk; converging state detecting means for generating a focus error signal representing a converging state of the light beam on an information storage layer of the optical disk; a focus position changing means for changing information about a target focus position of the light beam when modes of operation are switched between a read mode and a write mode, the target focus position of the light beam being defined relative to the information storage layer of the optical disk; a circuit offset canceling section for adding a read mode offset signal onto the focus error signal so as to cancel a read mode electrical offset that is produced in the read mode, and adding a write mode offset signal onto the focus error signal so as to cancel a write mode electrical offset that is produced in the write mode; and focus control means for controlling the operation of the actuator such that the focus position of the light beam matches its target focus position as closely as possible in accordance with information about the target focus position and the focus error signal, the method comprising the steps of when modes of operation are switched between a read mode and a write mode, changing the target focus positions of the light beam between a target for the read mode and a target for the write mode, changing the optical powers of the light beam produced by the light source between a power for the read mode and a power for the write mode, and adding a read mode offset signal onto the focus error signal so as to cancel a read mode electrical offset that is produced in the read mode, and adding a write mode offset signal onto the focus error signal so as to cancel a write mode electrical offset that is produced in the write mode.

16. An electronic component in which a program for driving an optical disk drive is stored, the optical disk drive including: a light source for producing a light beam; an objective lens for converging the light beam; an actuator for moving the objective lens with respect to an optical disk; converging state detecting means for generating a focus error signal representing a converging state of the light beam on an information storage layer of the optical disk; a focus position changing means for changing information about a target focus position of the light beam when modes of operation are switched between a read mode and a write mode, the target focus position of the light beam being defined relative to the information storage layer of the optical disk; a circuit offset canceling section for adding a read mode offset signal onto the focus error signal so as to cancel a read mode electrical offset that is produced in the read mode, and adding a write mode offset signal onto the focus error signal so as to cancel a write mode electrical offset that is produced in the write mode; and focus control means for controlling the operation of the actuator such that the focus position of the light beam matches its target focus position as closely as possible in accordance with information about the target focus position and the focus error signal, the program being defined so as to make the optical disk drive perform the steps of when modes of operation are switched between a read mode and a write mode, changing the target focus positions of the light beam between a target for the read mode and a target for the write mode, changing the optical powers of the light beam produced by the light source between a power for the read mode and a power for the write mode, and adding a read mode offset signal onto the focus error signal so as to cancel a read mode electrical offset that is produced in the read mode, and adding a write mode offset signal onto the focus error signal so as to cancel a write mode electrical offset that is produced in the write mode.

* * * * *

UNITED STATES PATENT AND TRADEMARK OFFICE
CERTIFICATE OF CORRECTION

PATENT NO.       : 7,606,121 B2                                     Page 1 of 1
APPLICATION NO. : 11/189539
DATED            : October 20, 2009
INVENTOR(S)      : Kuze et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 877 days.

Signed and Sealed this

Fifth Day of October, 2010

David J. Kappos
*Director of the United States Patent and Trademark Office*